(12) United States Patent
Ono et al.

(10) Patent No.: US 6,996,535 B1
(45) Date of Patent: *Feb. 7, 2006

(54) ELECTRONIC COMMERCE SUPPORT METHOD AND APPARATUS

(75) Inventors: Toshiyuki Ono, Kawasaki (JP); Chizuko Yasunobu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 570 days.

This patent is subject to a terminal disclaimer.

(21) Appl. No.: 08/979,810

(22) Filed: Nov. 25, 1997

(30) Foreign Application Priority Data

Nov. 28, 1996 (JP) .................................. 8-317439

(51) Int. Cl.
G06F 17/60 (2006.01)

(52) U.S. Cl. .............................. 705/26; 705/27; 705/1; 705/37; 705/39; 705/30

(58) Field of Classification Search .................. 705/26, 705/27, 1, 37, 39, 30
See application file for complete search history.

(56) References Cited

U.S. PATENT DOCUMENTS

| | | | | |
|---|---|---|---|---|
| 4,972,318 A | * | 11/1990 | Brown et al. .................. | 705/26 |
| 4,975,841 A | * | 12/1990 | Kehnemuyi et al. .......... | 705/32 |
| 5,101,353 A | * | 3/1992 | Lupien et al. ................. | 705/37 |
| 5,305,200 A | * | 4/1994 | Hartheimer et al. .......... | 705/37 |
| 5,592,378 A | * | 1/1997 | Cameron et al. ............. | 705/27 |
| 5,649,115 A | * | 7/1997 | Schrader et al. .............. | 705/33 |
| 5,717,989 A | * | 2/1998 | Tozzoli et al. ................ | 705/37 |
| 5,727,163 A | * | 3/1998 | Bezos .......................... | 705/27 |
| 5,799,289 A | * | 8/1998 | Fukushima et al. .......... | 705/400 |

(Continued)

FOREIGN PATENT DOCUMENTS

EP 370 146 5/1990

(Continued)

OTHER PUBLICATIONS

Towle, Henry, "On The Fast Track With Total Track: UPS Deploys Mobile Data Service", Document Delivery World, vol. 9, No. 9, (Apr./May 1993), pp. 30-31.*

(Continued)

*Primary Examiner*—Mark Fadok
(74) *Attorney, Agent, or Firm*—Mattingly, Stanger, Malur & Brundidge, P.C.

(57) ABSTRACT

A client is connected to a server for providing electronic commerce services in electronic commerce. An order is transmitted for a product in response to an input by a user to the server through a communications network. A trading identifier associated with the order and data on the contents of the order is received from the server, which is stored in a storage device. Associated trading processing information includes a present status of processing for processing initiated for the order, a present status of processing for delivery of the product corresponding to the order, a present status of processing for payment processing for the trading, and the trading identifier. During updating, a trading identifier is compared with trading identifiers included in the stored trading processing information, and a warning is output if they are not coincident. Updated trading processing information is added to the trading information stored in the storage device if they are coincident. The present status of processing for the processing initiated for the order, processing for delivery of the product corresponding to the order, and processing for the payment processing for the trading are managed until the order processing, delivery, and payment processing are completed.

30 Claims, 14 Drawing Sheets

U.S. PATENT DOCUMENTS

| | | | | |
|---|---|---|---|---|
| 5,832,459 A | * | 11/1998 | Cameron et al. | 705/26 |
| 5,845,263 A | * | 12/1998 | Camaisa et al. | 705/27 |
| 5,870,717 A | * | 2/1999 | Wiecha | 705/26 |
| 5,903,878 A | * | 5/1999 | Talati et al. | 705/26 |

FOREIGN PATENT DOCUMENTS

| | | | |
|---|---|---|---|
| EP | 0845749 | * | 11/1997 |
| FR | 2733068 | | 10/1996 |
| WO | WO94/28497 | | 12/1994 |
| WO | WO95/06918 | | 3/1995 |

OTHER PUBLICATIONS

Moeller, Michael, "FedEx Adds Shipping to Web", PC Week, vol. 13, No. 26, (Jul. 1, 1996), p. 100.*

"CompuServe Updates", Information Today, vol. 12, No.1 6, (Nov./Dec. 1995), p. 41.*

Frontiers of Electronic Commerce, Addison-Wesley Pub. Co., Inc. 1976, R. Kalakota et al, pp. 274-288.

* cited by examiner

FIG. 5

| HITACHI ONLINE SHOPPING ORDER INFORMATION INPUT SCREEN | | | |
|---|---|---|---|

◆ PURCHASED PRODUCT LIST

| PRODUCT NAME | QUANTITY | PRICE |
|---|---|---|
| RADISH | 1 | 198 |
| CARROT | 2 | 225 |
| | | |

◆ PAYMENT METHOD
- ● CREDIT CARD  ● ABC CREDIT  ○ HAPPY LOAN
- ○ ELECTRONIC MONEY
- ○ ACCOUNT TRANSFER

CARD NUMBER [ ]
VALID THROUGH [ ]
ACCOUNT NUMBER [ ]

◆ DELIVERY METHOD
- ● HOME DELIVERY

NAME [ ]
ADDRESS [ ]
TELEPHONE NUMBER [ ]
MAIL ADDRESS [ ]

( OK )  ( CANCEL )

500, 510, 520, 530, 540, 550

600 ELECTRONIC COMMERCE PROCEDURES

| PAYMENT METHOD | PAYMENT PROCESSING PROCEDURE |
|---|---|
| CREDIT CARD | ............ |
| ELECTRONIC MONEY | ............ |
| FUND TRANSFER BETWEEN ACCOUNTS | ............ |
| TRANSFER TO BANK ACCOUNT | ............ |
| CASH ON DELIVERY | ............ |

611 / 612

| DELIVERY METHOD | DELIVERY PROCESSING PROCEDURE |
|---|---|
| HOME DELIVERY (NORMAL) | ............ |
| HOME DELIVERY (EXPRESS) | ............ |
| NETWORK TRANSMISSION | ............ |

621 / 622

ORDER ACCEPTANCE PROCESSING 121

FIG. 8

TRADING INFORMATION 800

| | | |
|---|---|---|
| 801 | TRADING ID | 96-0710-1234 | △ |
| 802 | ORDER DATE | 96 / 07 / 10 | |
| | PRODUCT | SHIRTS | |
| | QUANTITY | 1 | |
| | PRICE | 4500 | |
| 803 | PAYMENT METHOD | CREDIT CARD | |
| | PAYMENT INSTITUTION ADDRESS | payment@abccard.co.jp | △ |
| | CARD NUMBER | 033-216-123456 | |
| 804 | DELIVERY METHOD | HOME DELIVERY | △ |
| | DELIVERY SERVICE PROVIDER ADDRESS | delivery@abcdistribution.co.jp | |
| | DESTINATION ADDRESS | 1099 OZENJI ASO-KU KAWASAKI-SHI | |
| 805 | BUYER | TOSHIYUKI ONO | |
| | MAIL ADDRESS | t-ono@hitachi.co.jp | |
| | ADDRESS | 1099 OZENJI, ASO-KU, KAWASAKI-SHI | |

FIG. 9

TRADING INFORMATION 900 DISPLAY SCREEN

CONFIRMATION OF TRADING INFORMATION

◆ ORDERED PRODUCTS

| ORDER DATE | SHOP | PRODUCT | PRICE | QUANTITY |
|---|---|---|---|---|
| 7 / 10 | HITACHI | SHIRT | 4500 | 1 |
| 7 / 10 | HITACHI | PANTS | 5500 | 1 |
| TOTAL | | | 10000 | |

~910

◆ PAYMENT / DELIVERY METHODS
 CARD NAME
 CARD NUMBER
 DELIVERY SERVICE PROVIDER
 DESTINATION ADDRESS                           ~920

◆ PERSONAL INFORMATION
 NAME              TOSHIYUKI ONO
 ADDRESS           1099 OUZENJI, ASO-KU,
                   KAWASAKI-SHI
 TELEPHONE NUMBER  044-966-91111
 E-MAIL ADDRESS    t-ono@hitachi.co.jp
                                               ~930

940 ( OK )    ( CANCEL ) 950

ORDER PROCESSING 134

CREATION OF ORDER PROCESSING STATUS 135

ORDER PROCESSING STATUS 1200

| | | |
|---|---|---|
| 801 | TRADING ID | 96-0710-1234 |
| 1201 | DELIVERED / NOT | FINISHED |
| 1202 | DELIVERY SCHEDULE / DELIVERED DATE | 96 / 07 /12 |

TRADING OF ORDER 136 PROCESSING STATUS

FIG. 14

DELIVERY PROCESSING STATUS 1400

| | |
|---|---|
| 801 — TRADING ID | 96-0710-1234 |
| 802 — PURCHASED DATE | 96 / 07 / 10 |
| NAME OF PURCHASED SHOP | HITACHI ON-LINE SHOP |
| E-MAIL ADDRESS OF PURCHASED SHOP | eshop@hitachi.co.jp |
| PRODUCT | SHIRTS |
| QUANTITY | 1 |
| PRICE | 4500 |
| 804 — DELIVERY METHOD | HOME DELIVERY |
| E-MAIL ADDRESS OF DELIVERY SERVICE PROVIDER | delivery@abcdistribution.co.jp |
| DESTINATION ADDRESS | 1099 OZENJI ASO-KU KAWASAKI-SHI |
| 805 — BUYER | TOSHIYUKI ONO |
| E-MAIL ADDRESS OF BUYER | t-ono@hitachi.co.jp |
| 1401 — DELIVERED / NOT | NOT |
| 1402 — DELIVERY SCHEDULE / DELIVERED DATE | 96 / 07 / 15 |

FIG. 15

PAYMENT PROCESSING STATUS 1500

| | |
|---|---|
| 801 — TRADING ID | 96-0710-1234 |
| 802 — PURCHASED DATE | 96 / 07 /10 |
| NAME OF PURCHASED SHOP | HITACHI ON-LINE SHOP |
| E-MAIL ADDRESS OF PURCHASED SHOP | eshop@hitachi.co.jp |
| PRODUCT | SHIRTS |
| QUANTITY | 1 |
| PRICE | 4500 |
| 803 — PAYMENT METHOD | CREDIT CARD |
| E-MAIL ADDRESS OF PAYMENT INSTITUTION | kessai@abccard.co.jp |
| CARD NUMBER | 033-216-123456 |
| 805 — BUYER | TOSHIYUKI ONO |
| E-MAIL ADDRESS OF BUYER | t-ono@hitachi.co.jp |
| 1501 — SETTLED / NOT | NOT |
| 1502 — PAYMENT SCHEDULE / SETTLED DATE | 96 / 08 / 05 |

FIG. 18

PRESENT TRADING PROCEDURE STATUS REQUEST SCHEDULE SCREEN 1800

SCHEDULE OF REQUEST FOR PRESENT STATUS
OF PROCEDURE FOR TRADING

◆ REQUESTED TRADING
- ■ NOT SHIPPED
- ■ NOT DELIVERED
- ■ UNPAID

~1801

◆ SCHEDULE
- ■ UPON POWER-ON
- ☐ ONCE PER [5] HOURS

~1802

OK   CANCEL

FIG. 19

WARNING DISPLAY SCREEN

DISPLAY OF PRESENT STATUS OF PROCEDURE FOR TRADING ~1600

◆ TRADING INFORMATION LIST

WARNING!
TRADING INFORMATION
NOT COINCIDENT
PLEASE CONFIRM

TOTAL OF UNPAID AMOUNT

REORDER (1606)   TRANSMIT RETURN REQUEST (1605)   CONFIRM PRESENT STATUS OF PROCEDURE (1604)

ELECTRONIC COMMERCE SUPPORT METHOD AND APPARATUS

CROSS-REFERENCE TO RELATED APPLICATION

This application relates to U.S. patent application Ser. No. 08/802,997, now U.S. Pat. No. 5,909,023, filed on Feb. 21, 1997 by T. Ono et al, entitled "ONLINE SHOPPING SUPPORT METHOD AND SYSTEM".

BACKGROUND OF THE INVENTION

The present invention relates to an electronic commerce support method and apparatus.

R. Kalakota et al., Frontiers of Electronic Commerce, Addison-Wesley Pub. Co., Inc, 1976, pp. 274–288 discloses search, order, payment, return, and so on of products in online shopping.

In the online shopping using a communication network such as Internet or the like, information on products provided therein can be visually and easily identified by a web browser using Hyper-Text Markup Language (HTML) and Virtual Reality Modelling Language (VRML), and so on. For placing an order, a desired product may be selected and information associated with the order be inputted.

After the order is completed, a statement of the order indicating the contents and purchase price of ordered products is transmitted through an electronic mail or sent by letter for confirmation. In many cases, ordered product are delivered by some home delivery service in several days. A product such as software electronically available through a network can be immediately downloaded into a storage device in a computer of a buyer.

As to payment for such products ordered through the online shopping, a credit card billing model may be utilized. In this case, an associated credit billing organization or card company bundles monthly trading utilized by the buyer for the past one month, totalizes the amount for revolving payment, and sends the buyer a card utilization statement which also serves as an advance notice of debit. Then, the noticed amount is automatically debited from a bank account specified by the buyer on a predetermined date.

It is expected that in future, the opportunities of utilizing the online shopping for purchasing products will be more and more increased, and products available on networks will extend to daily necessaries and so on, as personal computers and Internet are increasingly spread for domestic use. As the number of available products and the frequency of purchases in the online shopping are increased, it is envisaged that the management of information related to trading will become more complicated.

In the conventional online shopping, a personal computer is not capable of always providing detailed information on each of purchased products, for example, which of purchased products has been delivered, for which product the payment has been made, and so on. Information on ordered products is given to a buyer only when statements of ordered products are delivered from respective sellers to the buyer by letter through a postal service or the like, or only when the products are delivered to the buyer by a home delivery service. It is therefore difficult for a buyer to acquire what the buyer has ordered in the past, whether ordered products have been delivered, how much and when the buyer must pay, and so on when the buyer wants to know such information. In addition, the buyer has difficulties in accessing information on which product has not yet been delivered after a scheduled delivery date had been passed, information on where to inquire about undelivered products, and so on. Further difficulties are encountered in immediately knowing for which product the payment has not been made, how much the total amount sums up for unpaid products, whether the amount of money remaining in the specified account is sufficient to cover previous trading, and so on. Furthermore, it is difficult to check whether the contents of a statement sent to the buyer at a later date are coincident with the contents of orders which were placed far in the past.

SUMMARY OF THE INVENTION

It is an object of the present invention to provide an electronic commerce support method and system which are capable of solving the problems mentioned above and efficiently managing and utilizing trading information in the online shopping.

It is another object of the present invention to provide an electronic commerce support method and system which is capable of managing and utilizing trading information in electronic commerce, and acquiring a present status of processing for a trading, corresponding to the managed information, to enable a buyer to readily know the correspondence between orders and delivered products, unpaid orders, the total amount for the unpaid orders, and so on.

According to one aspect of the present invention, an electronic commerce support method for managing trading in a client connected to a server for providing electronic commerce services to receive the electronic commerce services comprises the steps of:

transmitting an order for a product on the electronic commerce in response to an input by a user to the server through a communication network, receiving trading information including a trading identifier associated with the order and data on the contents of the order from the server, and storing the trading information in a storage device;

receiving from the server trading processing information including a present status of processing (processing progress status) for processing initiated for the order, a present status of processing for delivery of the product corresponding to the order, a present status of processing for payment processing for the trading, and the trading identifier; and comparing the trading identifier included in the trading information with the trading identifier included in the trading processing information, and outputting a warning if they are not coincident, and adding the trading processing information to the trading information stored in the storage device if they are coincident.

According to another aspect of the present invention, an electronic commerce support method for managing trading in a server for providing a plurality of clients with electronic commerce services, comprises the steps of:

receiving an order for a product in the electronic commerce in response to an input by a user from a client through a communication network, and performing order acceptance processing for the product in accordance with a predetermined electronic commerce processing;

transmitting to the client trading information including a trading identifier associated with the order and data on the contents of the order;

creating trading processing information including a present status of processing (processing progress status) for processing initiated for the order, a present status of processing for delivery of the product corresponding to the order, a present status of processing for payment processing for the trading, and the trading identifier, and transmitting the trading processing information to the client; and managing the present status of processing (processing progress status) for the processing initiated for the order, the present status of the processing for delivery of the product corresponding to the order, and the present status of processing for the payment processing for the trading until the order processing, the delivery, and the payment processing are completed.

Trading for which delivery has been completed may be displayed separately from trading for which delivery has not been completed, from the present status of processing for delivery included in the trading information, and trading which have been payed or settled may be displayed separately from trading which have not been payed or settled, from the present status of processing for payment processing for the trading. In addition, a total amount of money for products included in the trading which have not been settled or unpayed may be calculated and displayed. The total amount of money may be compared with a predetermined limit amount, such that a warning is outputted if the total amount of money for the products exceeds the limit amount. Information on a product to be returned may be inputted based on the displayed trading information, and transmitted to the server.

BRIEF DESCRIPTION OF THE DRAWINGS

FIG. 5 shows a screen for inputting order information in the embodiment of the present invention;

FIG. 8 shows trading information in the embodiment of the present invention;

FIG. 9 illustrates a screen for displaying the trading information in the embodiment of the present invention;

FIG. 14 shows delivery processing status information in the embodiment of the present invention;

FIG. 15 shows payment processing status information in the embodiment of the present invention;

FIG. 18 illustrates a screen for inputting a present trading processing status request schedule in the embodiment of the present invention;

FIG. 19 illustrates a warning display screen in the embodiment of the present invention;

DETAILED DESCRIPTION OF THE PREFERRED EMBODIMENTS

An embodiment of the present invention will hereinafter be described in detail with reference to the accompanying drawings.

Figure 1:
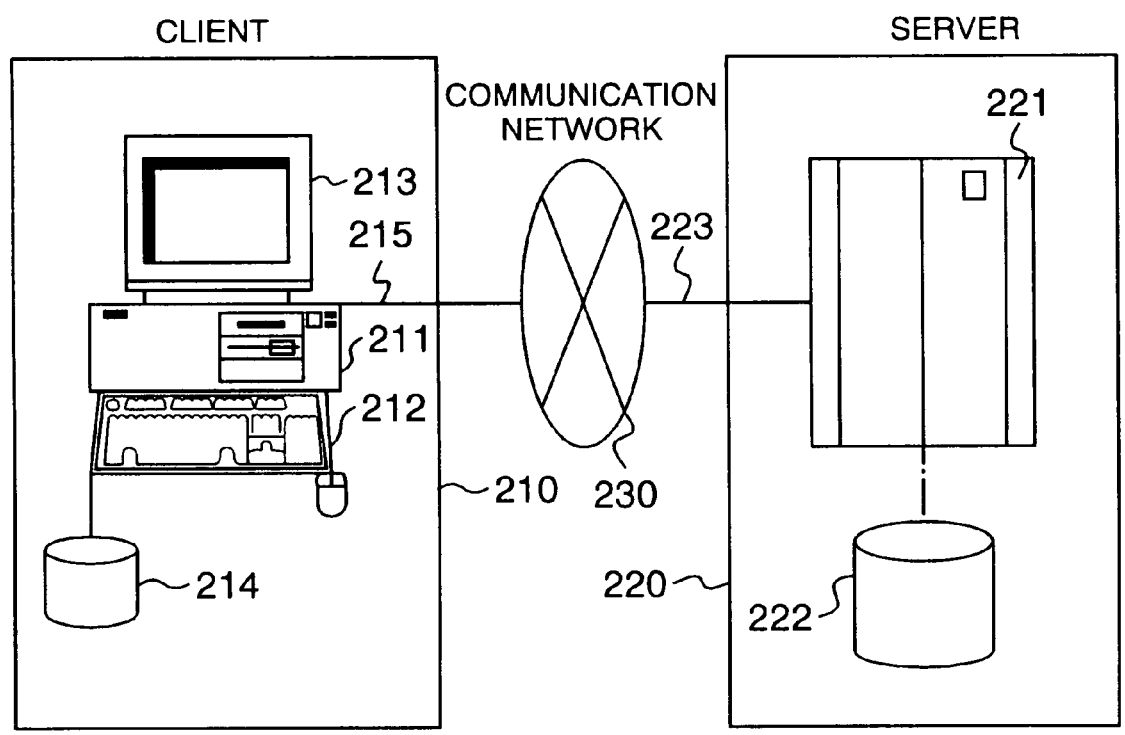
FIG. 1 is a block diagram illustrating a system configuration according to an embodiment of the present invention.

Reference is first made to the general configuration of an electronic commerce system illustrated in FIG. 1. The electronic commerce system of this embodiment is a system in which a client 210 and a server 220 are interconnected by a communication network 230.

(a) Device Configuration of Client 210:

The client 210 comprises a computer 211, and an input device 212, an output device 213, a storage device 214 and a communication cable 215 connected to the computer 211. The input device 212 comprises a keyboard and a pointing device (such as a mouse, a control pad, or the like). The output device 213 preferably comprises a high definition display and a speaker for correctly and precisely displaying products. The storage device 214 may be either of magnetic disk, an optical disk, and so on which have a sufficient storage capacity for storing programs and data files. The communicating cable 215 may be an optical cable, a telephone line, or the like. When the client 210 transmits and receives data to and from the communication network 230 through a wireless channel, the client 210 is provided with a wireless interface instead of the communication cable 215.

(b) Device Configuration of Server 220:

The server 220 comprises a computer 221, and a storage device 222 and a communication cable 223 connected to the computer 221.

While the device configuration for implementing the present invention may be what is generally called a computer system, the server 220 should be a high speed and high capability computer system for simultaneously providing a large number of clients with electronic commerce services.

(c) Device Configuration of Communication Network 230:

The communication network 230 comprises Internet, personal computer communications, and other networks using wired or wireless channels.

Figure 2:
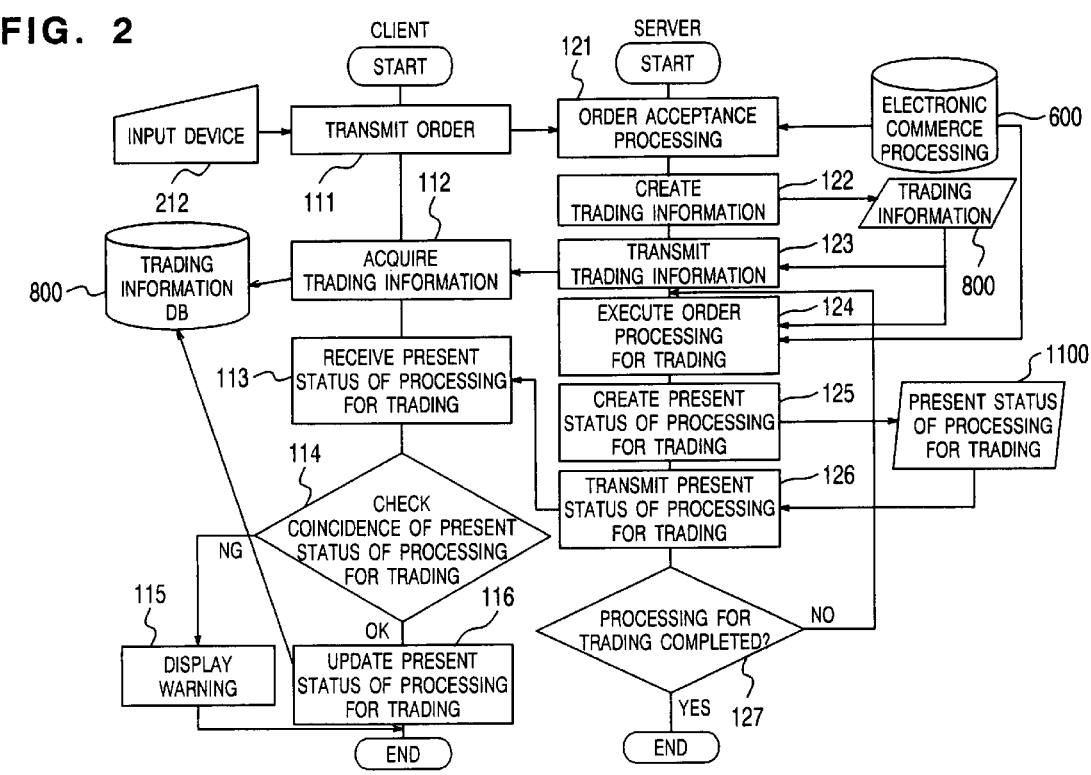
FIG. 2 is a flow chart illustrating overall processing executed in an electronic commerce support method according to one embodiment of the present invention.

A general processing flow of the electronic commerce support system according to this embodiment of the present invention will hereinafter be described with reference to FIG. 2.

First, the client 210 inputs information on an order for a desired product including the quantity, price, address, name and payment method, and transmits the information to the server 220 using WWW (World Wide Web), an electronic mail, or the like (step 111). The server 220 receives the order information through the communication network 230, and proceeds order acceptance processing in accordance with a predetermined electronic commerce processing (step 121).

The electronic commerce processing herein used includes a processing which has been previously determined in accordance with a payment method and a delivery method for an order. The server 220 creates trading information indicative of the contents of the trading based on the order information (step 122). Then, the server 220 transmits the trading information to the client 210 using WWW (World Wide Web), an electronic mail, or the like (step 123). The client 210 receives the trading information and stores it in the storage device 214 (step 112). In the mean time, the server 220 executes the electronic trading based on the trading information, i.e., checks the stock, executes the order processing (determines a shipping date) and delivery processing (determines a delivery date), and determines a payment date (from a purchase day) (step 124). With the processing of this trading, the server 220 creates information indicative of a present status of processing for the trading (step 125). The processing of the trading may be performed by another server, and the information indicative of the present status of processing may be transmitted from this server. More specifically, the information on the present status of the processing for electronic commerce includes data indicative of sending-out status, delivery status, payment status, and so on for a product ordered by the electronic commerce. The server 220 transmits the created present status of processing for the trading to the client 210 using WWW (World Wide Web), an electronic mail, or the like (step 216). If the processing for the trading is not completed, the processing for pending items is repeated at and after step 124 (step 127). The client 210 receives this present status of processing for the trading (step 113). Then, the client 210 checks the coincidence between the received present status of processing for the trading with the trading information previously stored in the storage device 214 (step 114). If a trading identifier contained in the received present status of processing does not match any of trading identifiers stored in the storage device 214 of the client 210, or if an error is found between trading information before updated and trading information after updated, a warning is outputted (step 115). Otherwise, based on the received trading identifier, the client 210 updates the present status of processing for the trading associated with trading information with the trading identifier stored in the storage device 214 (step 116).

In the following, a first specific example of the present invention will be described with reference to FIGS. 3, 4. In this specific example, a client 210 is also connected to a delivery managing server 410 and a payment managing server 420 through a communication network 230 in addition to a shopping server 220. The shopping server 220 may include functions of the delivery managing server and the payment managing server. In this case, the device configuration includes the shopping server alone.

Figure 3:
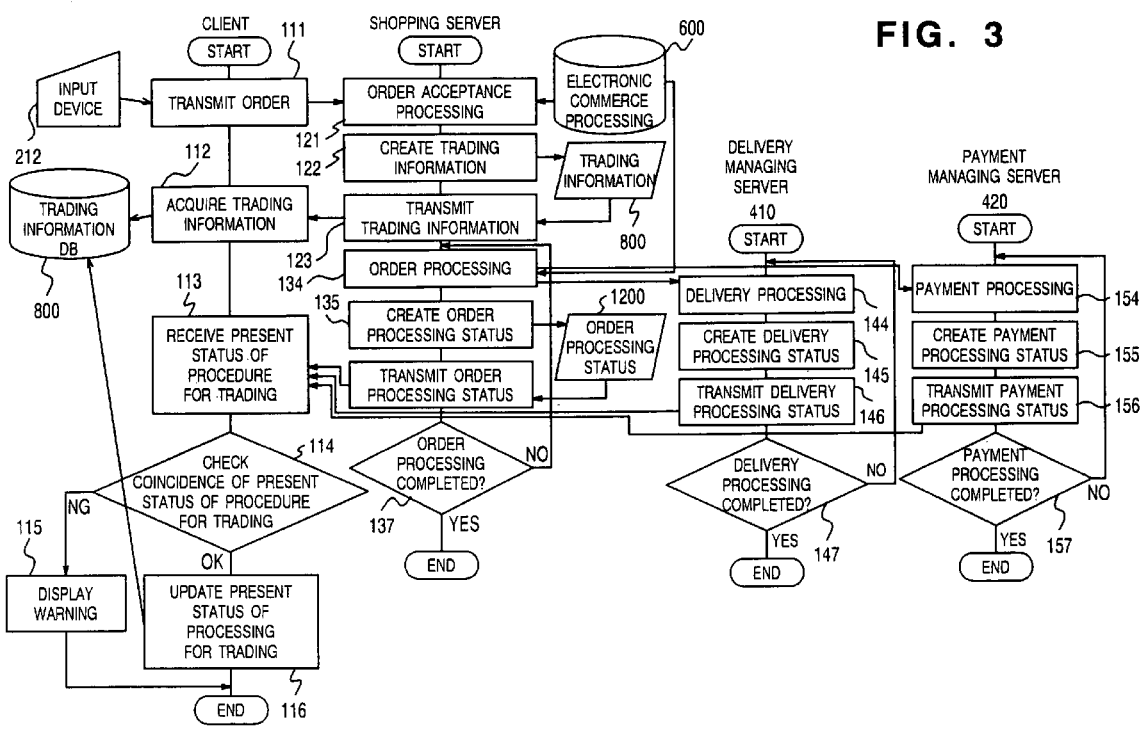
FIG. 3 is a flow chart illustrating in detail the overall processing executed in the electronic commerce support method of FIG. 2.
Figure 4:
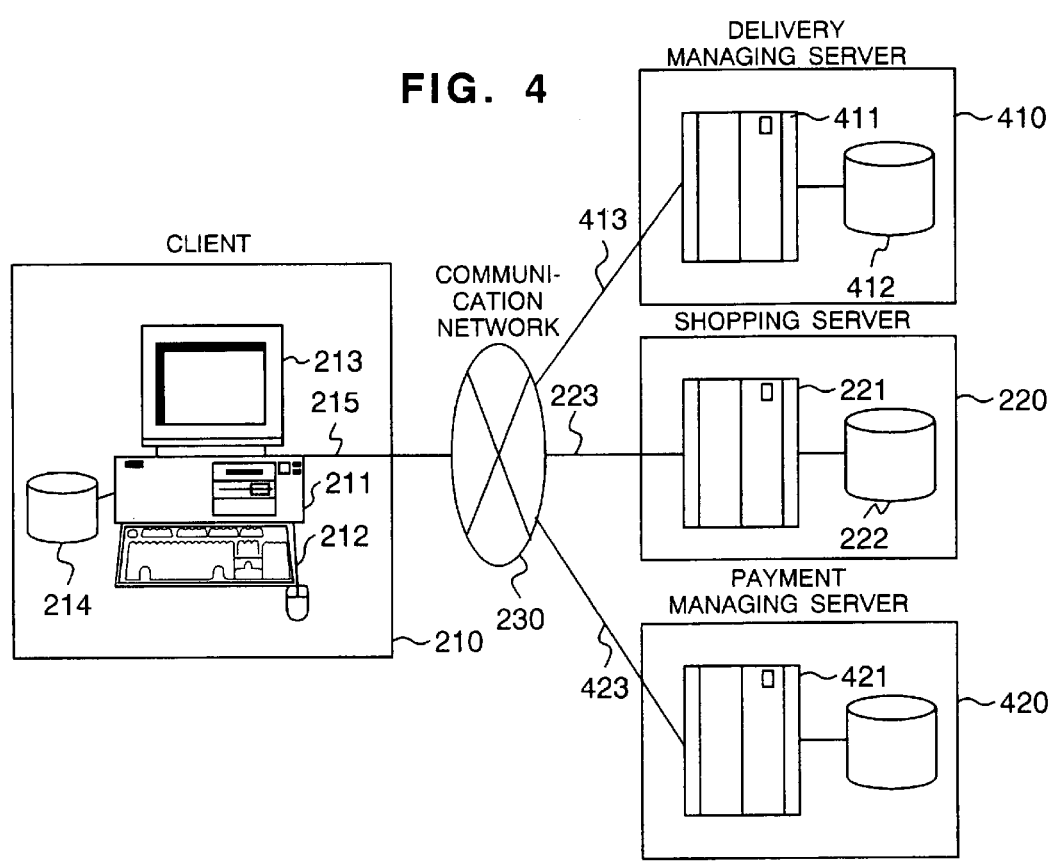
FIG. 4 is a block diagram illustrating a system configuration according to an embodiment of the present invention.

FIG. 3 illustrates a processing flow in the first specific example, and FIG. 4 illustrates a general configuration of the system in the first specific example. The general configuration of the electronic commerce system illustrated in FIG. 4 has the delivery managing server 410 and the payment managing server 420 connected to the configuration illustrated in FIG. 1 through the network 230. Since the rest of the configuration in FIG. 4 is identical to FIG. 1, explanation thereof is omitted. The delivery managing server 410 and the payment managing server 420, which have the same device configuration as the shopping server 220, each comprise a computer, a storage device, and a communication cable.

Next, respective processing steps illustrated in FIG. 3 will be described in detail along the flow of the processing in FIG. 3.

<Step 111> Client: Transmission of Order:

The client 210 accesses the shopping server 220 using communication software such as an Internet browser, a Web browser or the like installed in the computer 211, and acquires product information. Then, the client 210 selects and determines a product to be ordered on the basis of the received product information, and creates order information to be transmitted to the shopping server 220. A screen for creating the order information is illustrated in FIG. 5 as an order information input screen 500. The order information input screen 500 includes a purchased product list 510, a payment method input area 520, a delivery method input area 530, and a personal information input area 540. The purchased product list 510 indicates the name, quantity, and price of each ordered product. In the payment method input area 520, a payment method for ordered products is selected from means such as a credit card, electronic money, and so on, and ID information and so on are inputted for the ordered products. In the delivery method input area 530, a delivery method is selectively inputted, such as a home delivery service or the like. In the personal information input area 540, the name, address, telephone number, and "where to contact" such as an E-mail address are inputted. When an "OK" button 550 is selectively inputted through the input device 212 after required items in each input area have been inputted using the input device 212, the inputted order information is transmitted to the shopping server 220 through the communication cable 215 and the communication network 230.

Figures 6, 7:
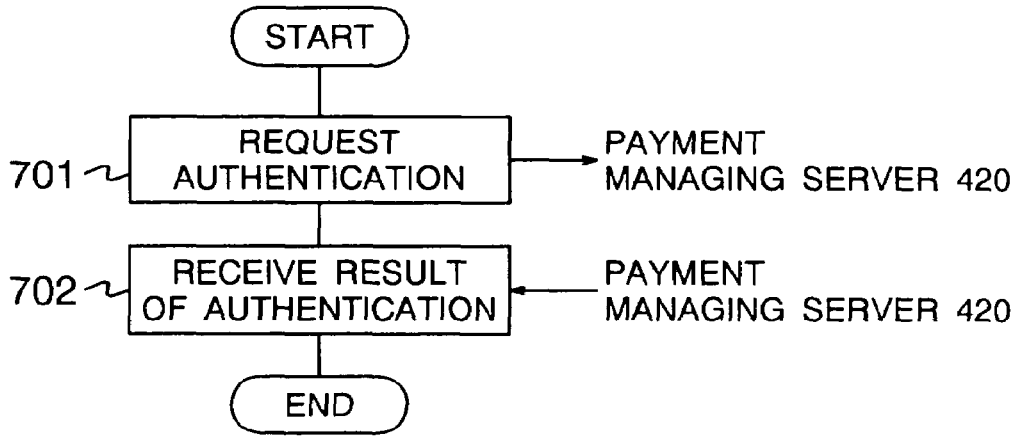
FIG. 6 shows tables for storing data related to order processing in the embodiment of the present invention.
FIG. 7 is a flow chart illustrating the order acceptance processing in the embodiment of the present invention.

<Step 121> Server: Order Acceptance Processing:

The shopping server 220 receives order information through the communication network 230. Then, the shopping server 220 executes the order acceptance processing in accordance with an electronic commerce processing corresponding to the received order information from electronic commerce processing 600 previously stored in the storage device 222. FIG. 6 shows an outline of the electronic order processing 600. A payment method column 611 shows a list of payment methods, while a payment processing column 612 contains a processing required by each payment method.

Stated another way, a payment processing corresponding to a payment method specified by order information is executed in accordance with the electronic commerce processing 600. Similarly, a delivery method column 621 shows a list of delivery methods, while a delivery processing column 622 indicates a processing corresponding to each delivery method. The payment processing and the delivery processing include the order of processing corresponding to each method, and the addresses of the payment managing server and the delivery managing server required for the processing. The payment methods include, for example, credit card payment, electronic money payment, transfer of funds between bank accounts, and so on. The delivery methods include, for example, home delivery, transmission of electronic goods such as software through a network, and so on.

FIG. 7 illustrates detailed steps of the order acceptance processing 121 when the credit card payment, for example, is selected in order information. The shopping server 220 requests the payment managing server 420 to authenticate whether an orderer has a settling capability (step 701). For this purpose, the shopping server 220 transmits necessary information for the authentication such as the name, address, telephone number, credit card number, card available period, and so on within the order information from the client 210 to the payment managing server 420 at a predetermined destination address. Next, the shopping server 220 receives the result of the requested authentication from the payment managing server 420 (step 702).

<Step 122> Server: Creation of Trading Information:

The shopping server 220 creates trading information 800 indicative of the contents of a contract associated with order information.

FIG. 8 shows an example of the trading information 800. The trading information 800 includes an order ID 801 for identifying a trading; order specific information 802 indicative of the contents of an order such as a purchase date, product name, quantity, and price; payment information 803 related to a method of proceeding the trading (payment method, E-mail address of payment institution); delivery information 804 (delivery method, E-mail address of delivery service provider); and orderer information 805 for identifying the orderer such as a buyer name, E-mail address, delivery destination address, and so on.

The shopping server 220 stores the created trading information 800 in the storage device 222.

<Step 123> Server: Transmission of Trading Information:

The shopping server 220 transmits the trading information 800 indicative of the contents of a contract associated with order information to the client 210. In this event, information related to the name of a shop and the address of the shopping server are added to the transmitted trading information 800. Here, a protocol utilized by the shopping server 220 for transmitting the trading information may be Simple Mail Transport Protocol (SMTP) which is a standard protocol for electronic mail, Hypertext Transport Protocol which is a standard protocol for WWW, and so on. A similar protocol may be used also for transmission and reception of information between the server and the client in subsequent steps.

<Step 112> Client: Acquisition of Trading Information:

The client 210 receives the trading information 800 indicative of the contents of a contract associated with order information from the server 220 through the communication network 230. FIG. 9 illustrates a trading information display screen 900 which displays received trading information 800. The trading information display screen 900 is provided for confirming the order information and comprises an ordered product area 910, a delivery method and payment method area 920, and personal information area 930. With the information displayed on the screen 900, the orderer confirms whether the contents of the order are free of errors, and so on.

The client 210 selectively inputs an "OK" button 940 if no error is found in the contents of the order. The trading information is stored in the storage device 214. If the order is canceled at this time, a "cancel" button 950 is selectively inputted. When the order is canceled, order cancel information is transmitted to the server 220 through the communication network 230 together with an associated trading identifier. The server 220 executes processing for canceling the order corresponding to the trading identifier associated with the received order cancel information.

Figure 10:
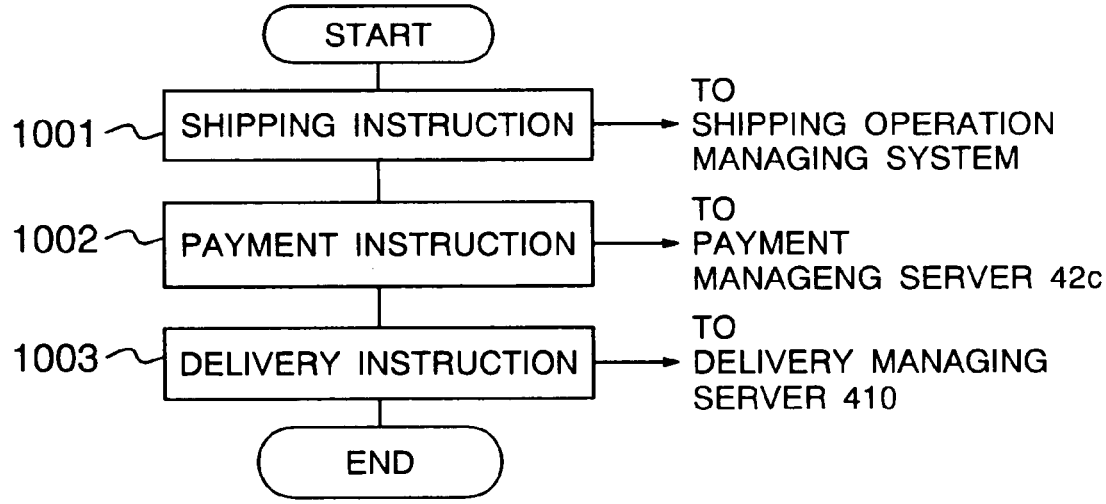
FIG. 10 is a flow chart illustrating the order processing in the embodiment of the present invention.

<Step 134> Shopping Server: Order Processing:

The shopping server 220 executes the order processing. A detailed flow of the order processing is illustrated in FIG. 10.

An order processing instruction is transmitted for an ordered product. The order processing instruction may be, for example, a product manufacturing instruction, a shipping instruction, and so on. The following description is made based on an example of shipping instruction. A shipping instruction is first transmitted to a shipping operation managing system responsible for the management of shipping operations (step 1001). The shipping operation managing system manages information on scheduled shipping operation of products and a present status of shipping operation, and provides the information in response to a request thereto. The shipping instruction initiates a shipping operation for a product, and the shipping operation managing system manages the present status of the shipping operation.

Next, payment instructing information is transmitted to the payment managing server 420 of an associated payment institution for the order (step 1002). Delivery instructing information is transmitted to the delivery management server 410 of an associated delivery service provider (step 1003). The payment instructing information and the delivery instructing information, which have contents similar to those of the trading information 800, include information which permits the payment institution and the delivery service provider to settle an associated trading and deliver a product associated with the trading, respectively. Step 1002 and step 1003 may be executed in the reverse order. Processing flows for the delivery managing server 410 and the payment managing server 420 will be described later.

Figure 11:
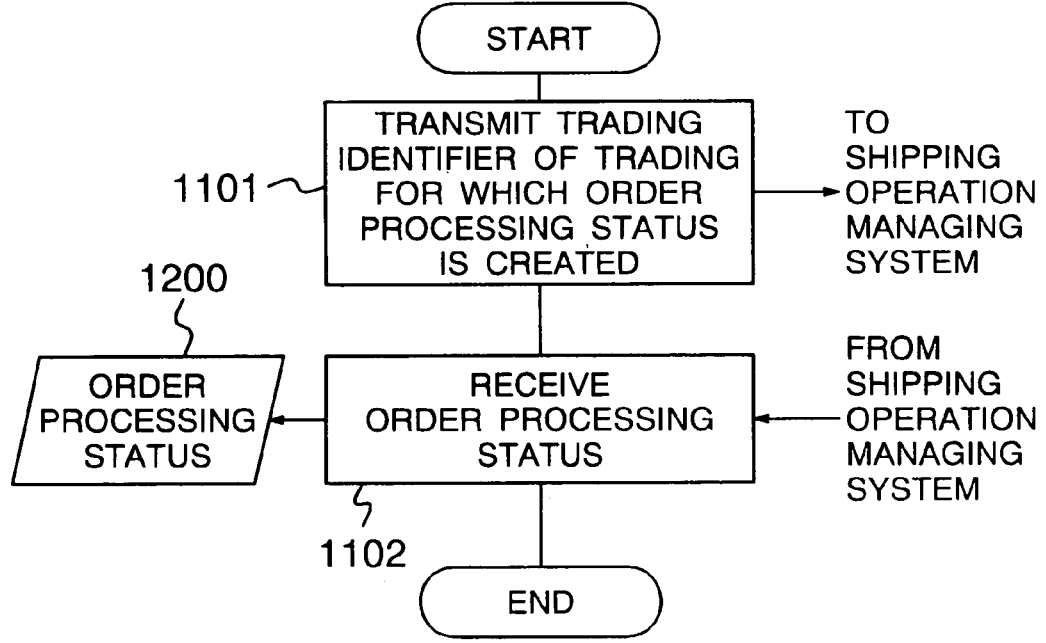
FIG. 11 is a flow chart illustrating order processing status creation in the embodiment of the present invention.

<Step 135> Shopping Server: Creation of Order Processing Status:

The shopping server 220 creates an order processing status. FIG. 11 illustrates an example of a processing flow for creating the order processing status. First, the shopping server 220 transmits a trading identifier to a shipping operation managing system (step 1101). Then, the shopping server 220 receives an order processing status corresponding to the trading identifier from the shipping operation managing system (step 1102). Alternatively, the shipping operation management system may transmit an order processing status to the shopping server 220 each time the shipping operation advances.

Figures 12, 13:
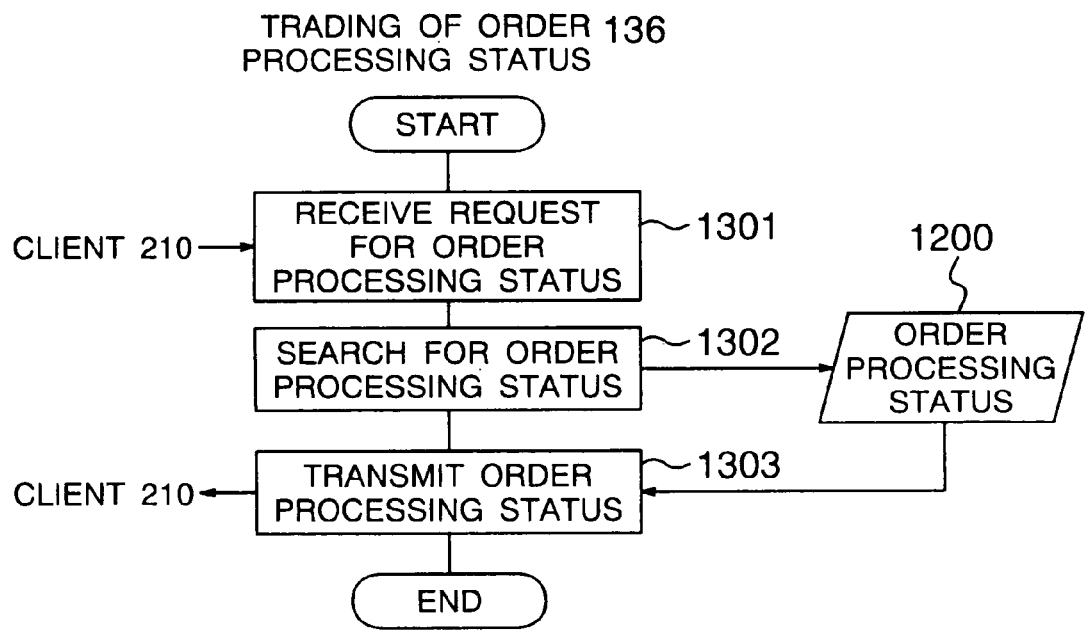
FIG. 12 shows order processing status information in the embodiment of the present invention.
FIG. 13 is a flow chart illustrating the processing of transmitting the order processing status in the embodiment of the present invention.

FIG. 12 shows an example of data contained in the order processing status 1200 which is received by the shopping server 220. The order processing status 1200 includes information 1201 as to whether an ordered product has been delivered or not, and a scheduled delivery date or a delivery completed date 1202, both corresponding to a trading ID 801 in the trading information 800. The created order processing status 1200 is stored in the storage device 222.

<Step 136> Shopping Server: Transmission of Order Processing Status:

The shopping server 220 transmits the order processing status 1200 created at step 135 to the client 210 through the communication network 230. Here, the destination of the order processing status 1200, i.e., the client is a buyer contained in trading information which is retrieved from the storage device 222 by making a search, with a trading ID in the order processing status 1200 used as a search key, for trading information having the corresponding trading ID 801. The transmission of the order processing status 1200 may be performed in response to a request from the client 210.

FIG. 13 illustrates a processing flow for the transmission of the order processing status 1200 in response to a request from the client 210. The shopping server 220 receives a request for an order processing status from the client 210 (step 1301). The request for the order processing status includes a trading ID for identifying a trading to which the requested order processing status 1200 is related. The shopping server 220 searches the storage device 222 for the order processing status 1200 corresponding to the trading ID contained in the request, based on the request for the order processing status from the client 210 (step 1302). Then, the shopping server 220 transmits the retrieved order processing status 1200 to the client 210 which is the requester of the order processing status (step 1303).

<Step 137>

If the order processing status transmitted at step 136 shows that the order processing has not been completed, the processing is continuously repeated from the order processing at step 134 onward.

Reference is next made to a trading processing, creation of a trading processing status, and transmission performed by the delivery managing server 410 and the payment managing server 420.

<Steps 144, 154> Delivery Managing Server, Payment Managing Server: Delivery Processing, Payment Processing:

In response to the order processing at step 134 executed by the shopping server 220, the payment managing server 420 of a payment institution associated with the order receives payment instructing information, while the delivery managing server 420 of a delivery service provider associated with the order receives delivery instructing information. Then, the delivery managing server 410 and the payment managing server 420 execute payment processing and delivery processing based on the received payment instructing information and delivery instructing information, respectively. The payment processing is made after client examination is passed at a CAFIS (Credit and Finance Information System) center, and includes notifying a seller of payment for sales, paying the seller for the sales, calculating a debited amount, notifying the buyer of a date on which a specified account is debited, together with the debited amount, debiting the amount from the account on the debiting date, and so on.

A home delivery operation is performed in response to a delivery instruction in the order of collection of products to be delivered, concentration of products to a terminal, distribution of products to respective destination regions, transport of products between terminals, delivery, and so on. A home delivery information system collects and manages information on each ordered product from an associated operation site each time activities such as collection, distribution, transport, and delivery of the product take place. In this event, a scheduled home delivery date is calculated and managed together with the foregoing information. Alternatively, the payment processing and the delivery processing may be executed in a different system connected through a network.

<Steps 145, 155> Delivery Managing Server, Payment Managing Server: Creation of Delivery Processing Status, Creation of Order Processing Status:

A delivery processing status 1400 and a payment processing status 1500 are created based on the delivery processing and the payment processing executed at steps 144, 154, respectively. FIG. 14 shows the delivery processing status 1400, and FIG. 15 shows the payment processing status 1500. The delivery processing status 1400 includes information 1401 as to whether an associated product has been delivered or not and a scheduled delivery date or a delivery completed date 1402, corresponding to the trading information 800. The payment processing status 1500 includes information 1501 as to whether an associated order has been settled or not, and a scheduled payment date or a settled date, corresponding to the trading information 800.

<Steps 146, 156> Delivery Managing Server, Payment Managing Server: Transmission of Delivery Processing Status, Transmission of Payment Processing Status:

The delivery managing server 410 and the payment managing server 420 transmit the delivery processing status 1400 and the payment processing status 1500 created at steps 145, 155, respectively, to the client 210 through the communication network 230. Alternatively, the transmission of the delivery processing status 1400 and the payment processing status 1500 may be executed in response to a request from the client 210. Since the transmission at steps 146, 156 is substantially the same as that of the shopping server described at step 136, detailed explanation is omitted.

<Steps 147, 157> Delivery Managing Server, Payment Managing Server:

If the delivery processing status and the payment processing status transmitted at steps 147, 157 show that the delivery processing and the payment processing have not been completed, the processing is continuously repeated from steps 144, 154 onward.

Next described is the processing executed in the client 210 for updating a present status of processing for a trading.

<Step 113> Client: Reception of Present Status of Processing for Trading:

The client 210 receives a present status of processing for a trading from each of the shopping server 220, the delivery managing server 410, and the payment management server 420 through the network 230.

Figure 16:
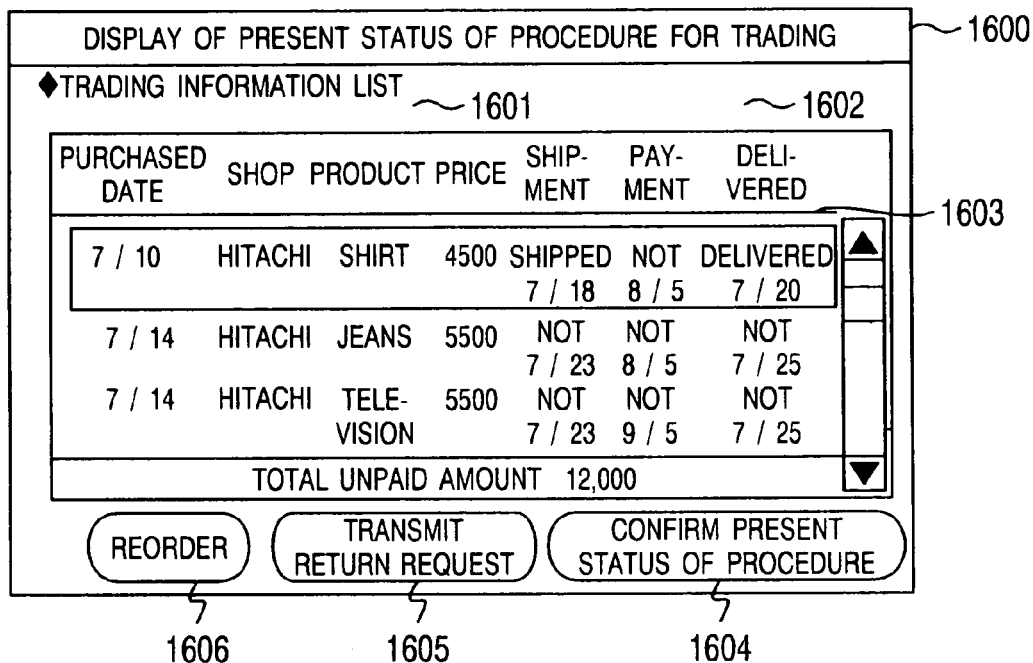
FIG. 16 illustrates a screen for displaying a present status of processing for a trading in the embodiment of the present invention.

FIG. 16 illustrates an example of a screen 1600 for displaying the present status of processing for trading. The present trading processing status screen 1600 includes a trading content display area 1601, and a present processing status display area 1602 related to order processing, the payment processing and the delivery processing for displaying the present status of processing related to the order processing, the payment processing, and the delivery processing associated with each trading. Alternatively, the present trading processing status screen 1600 may display whether the order processing has been completed or not; whether the payment processing has been completed or not; and whether the delivery processing has been completed or not by trading date.

Figure 17:
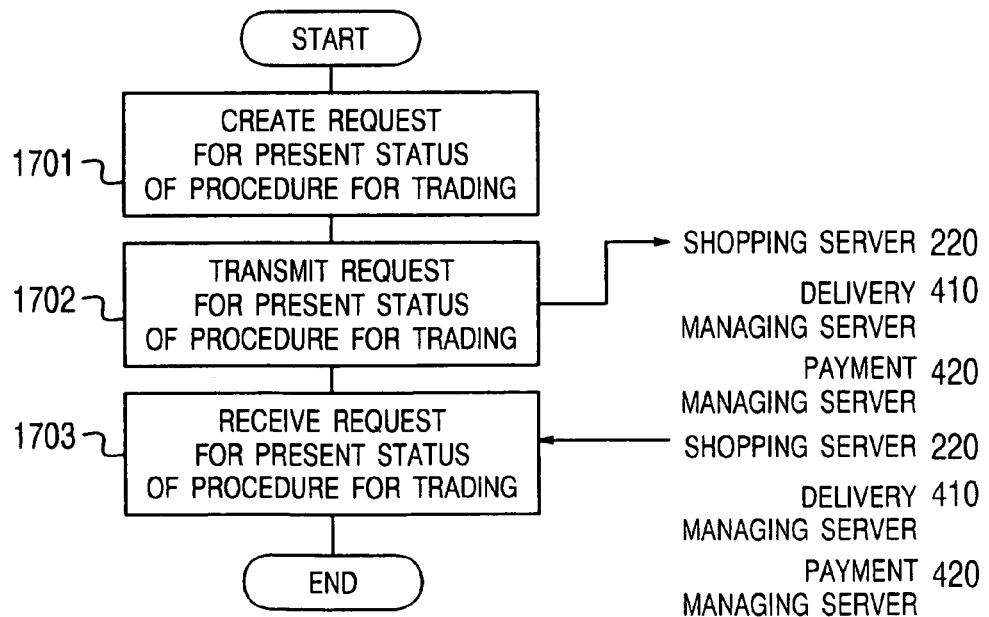
FIG. 17 is a flow chart illustrating the processing for requesting a present status of processing for a trading in the embodiment of the present invention.

The reception of the present status of processing for a trading may be performed such that the client 210 selectively requests a server for trading information to be updated, and receives the requested trading information. FIG. 17 illustrates an alternative processing flow of the processing step 113 for updating a present status of processing for a trading. First, a request for a present status of processing for a trading is created (step 1701). The request for a present status of processing for a trading may be created by selecting desired trading information from the trading information list 1603 and selectively inputting a "present processing status confirmation" button 1604 on the present trading processing status display screen 1600.

FIG. 18 illustrates a present trading processing status request schedule display 1800 for automatically displaying a present status of processing for a trading. The present trading processing status request schedule display 1800 includes a selection area 1801 for requesting a present status of processing and a request schedule input area 1802. In accordance with a schedule inputted in the requested schedule input area 1802, a request for confirming a present status of processing is created for requested trading information inputted in the selection area 1801 for requesting a present status of processing. In this way, the present status of processing can be automatically confirmed without requiring the user to input his intention of requesting the confirmation of the present status of processing. Next, the request for confirming the present status of processing for selected trading information is transmitted to the shopping server 220, the delivery managing server 410, and the payment managing server 420 based on the destinations contained in the trading information (step 1702). The client 210 receives the present status of processing for the selected trading information from the shopping server 220, the delivery managing server 410, and the payment managing server 420, to which the request has been transmitted, and updates and displays the present trading processing status request schedule display 1800 (step 1703).

<Step 114> Client: Coincidence Check for Present Status of Processing for Trading:

The client 210 checks whether or not a trading ID of a present status of processing for a trading received from a server does not match any of trading IDs of trading information 800 stored in the storage device 214, or whether or not the trading information includes erroneous contents with respect to the information before updated. The processing branches to step 115 if any error is found and otherwise to step 116.

<Step 115> Client: Output of Warning for Error in Present Status of Processing for Trading:

A warning is outputted for notifying any error in the present status of processing for a trading received at step 113. FIG. 19 illustrates an example of an outputted warning display screen 1900.

<Step 116> Client: Update of Present Status of Processing for Trading:

A received present status of processing for a trading is updated for a trading ID corresponding to trading information 800 stored in the storage device 214.

According to this specific example as described above, the client 210 stores trading information indicative of the contents of a trading in the storage device 214 when an order is placed, and updates the present status of processing for the trading from the shopping server 220, the delivery managing server 410, and the payment managing server 420 based on the trading information, so that the client 210 is always aware of the delivery status and the payment status for the order and can manage the order corresponding to each status.

Reference is next made to a second specific example of the present invention. The second specific example illustrates that a product is returned, after the acquisition of the present status of processing for a trading, based on trading information.

Figure 20:
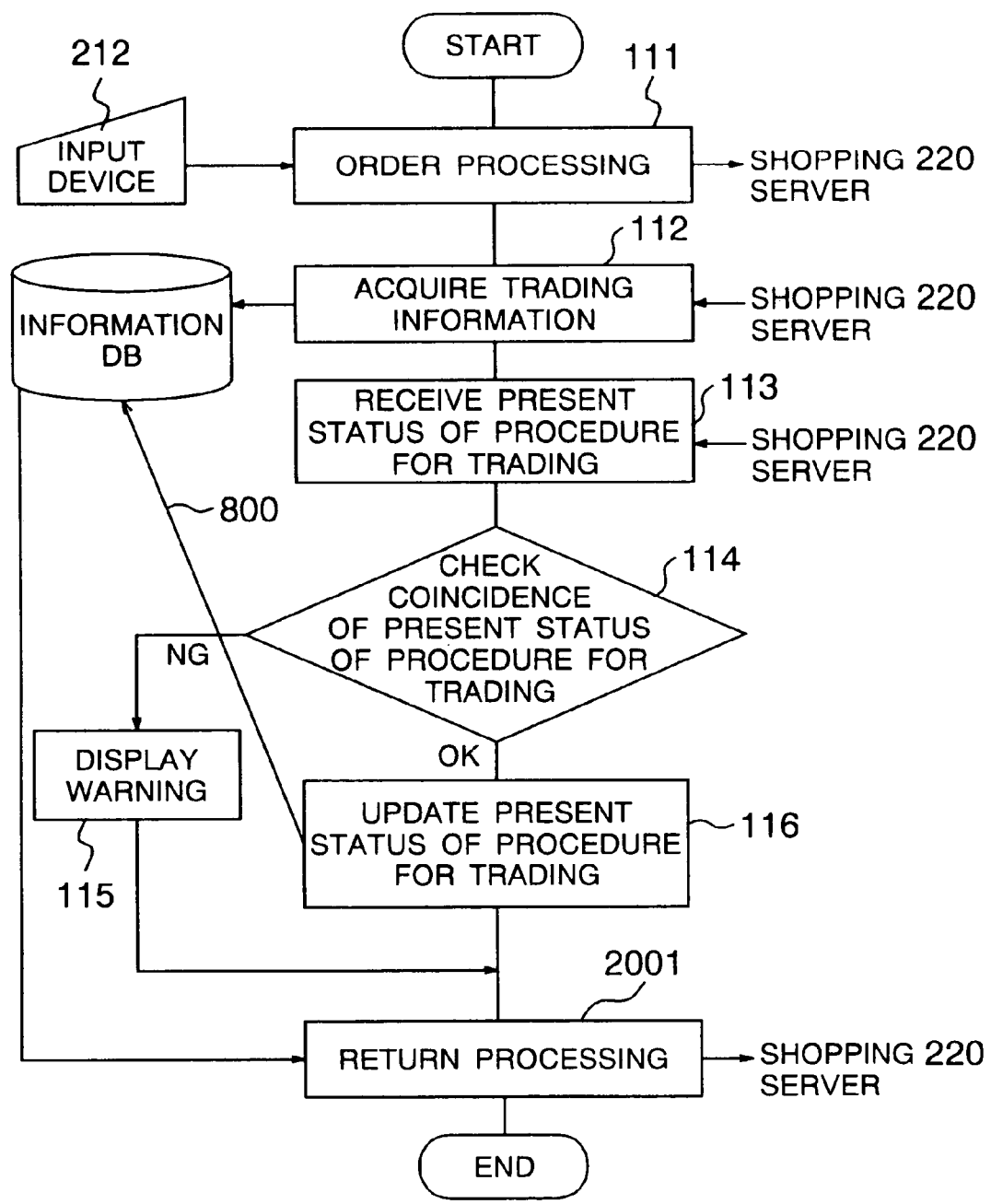
FIG. 20 is a flow chart illustrating the product return processing in the embodiment of the present invention.

FIG. 20 illustrates a processing flow of the second specific example. This processing flow is substantially the same as the processing flow of the client 210 illustrated in FIG. 2. A difference is that FIG. 20 includes return processing at step 2001 after a sequence of steps 111–116. Thus, explanation on steps 111–116 is omitted.

<Step 2001> Return Processing:

The return processing may be executed by selecting desired trading information from the trading information list 1600 and selectively inputting a "transmit return request" button 1605 in the present trading processing status display screen 1600. This causes a trading identifier associated with a return requested product and return requesting information to be transmitted to the shopping server 220 in the trading information through the communication network 230. Assume that "return" used herein also includes cancellation of a trading. The shopping server 220 receives the return requesting information, and takes appropriate actions such as cancellation of the trading processing corresponding to the trading identifier, refund processing, and so on.

Thus, according to this specific example, it is possible to smoothly execute the return processing depending on various situations such as delayed delivery, unsettled trading, and so on.

Reference is next made to a third specific example of the present invention. The third specific example illustrates that another order is placed, after the acquisition of the present status of processing for a trading, based on trading information.

Figure 21:
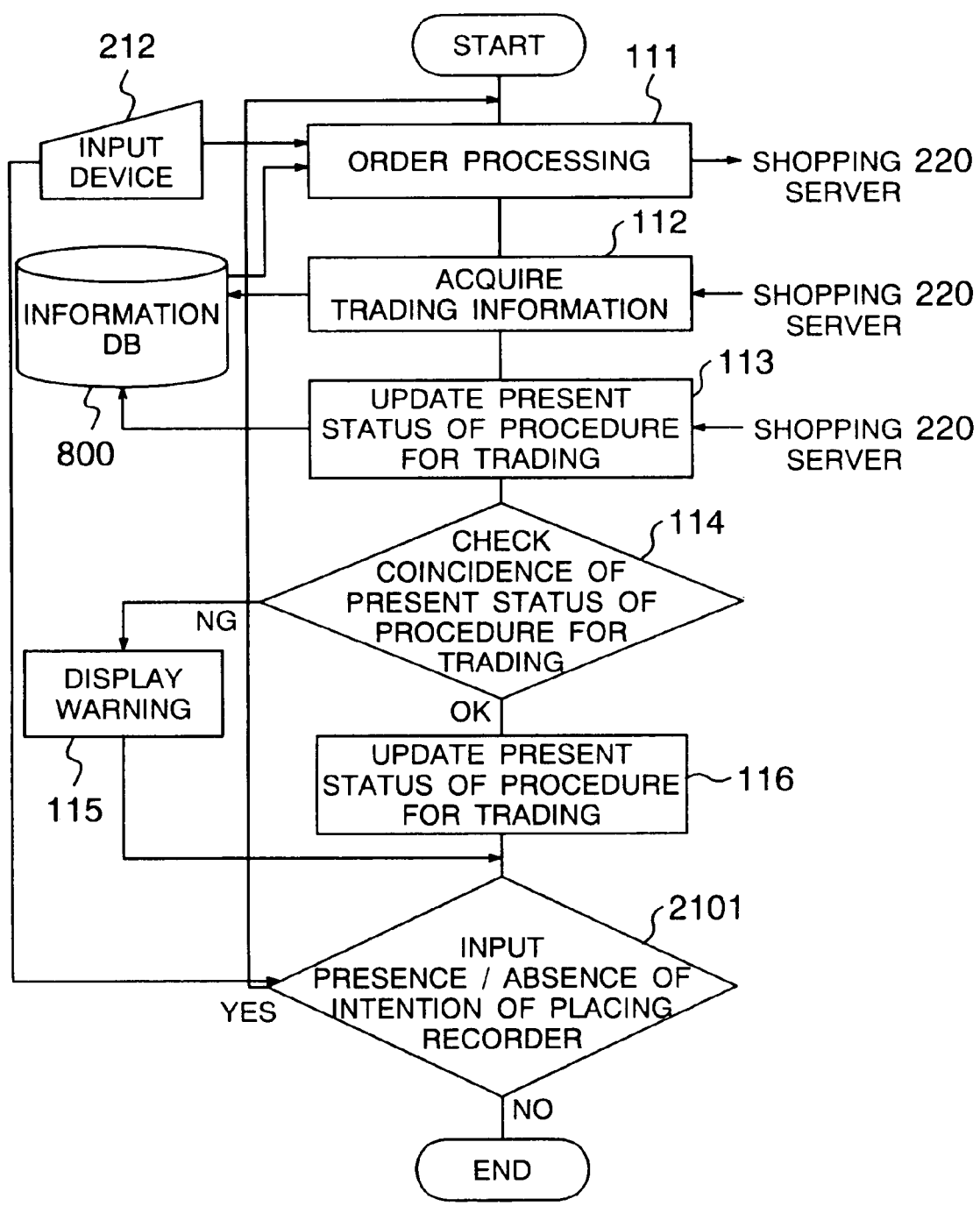
FIG. 21 is a flow chart illustrating the reorder processing in the embodiment of the present invention.

FIG. 21 illustrates a processing flow of the third specific example. This processing flow is substantially the same as the processing flow of the client 210 illustrated in FIG. 2. A difference is that FIG. 21 includes, after step 116, step 2101 at which it is determined whether or not the client has an intention of placing a new order, followed by the processing jumping to the order processing at step 111, if the client has such intention, to utilize trading information. Thus, explanation on steps 111–116 is omitted.

<Step 2101> Input of Presence or Absence of Intention of Placing Reorder:

The input device 212 is used to input the presence or absence of an intention of placing a new order. Specifically, new order processing is executed only by selecting desired trading information in the trading information list 1603 and selectively inputting a "reorder" button 1606 in the present trading processing status display screen 1600. When the "reorder" button 1606 is inputted, the processing branches to step 111.

<Step 111> Order Processing:

An order information input screen similar to that of FIG. 5 is displayed. In this event, information required for the order has already been inputted based on the trading information selectively inputted at step 114. If some order information is to be changed, the input device 212 is used to input a change, and the "OK" button 550 is selectively inputted, causing the contents of a trading associated with the reorder to be transmitted to the address of the shopping server in the trading information through the communication network 230.

Thus, according to this specific example, since a new order can be placed making the most of previous trading information, a reorder can be simply placed, particularly for frequently ordered products such as daily necessaries, without inputting all order information from the beginning.

As mentioned above, transmission and reception of trading information between a client and a server are performed through a communication network. For this reason, the trading information must be secured from tapping, violence, and so on. For the security purpose, the following method is used.

A variety of information communicated between a server and a client is encrypted. Cryptology used in the encryption may be either of a public key cryptography such as Rivest-Shamir-Adleman (RSA) and a common key cryptography such as Data Encryption Standard (DES). This countermeasure can prevent trading information from being intercepted or violated by a third party, thereby making it possible to ensure safe trading and protection of privacy.

The programs for executing the processing illustrated in FIGS. 2, 3, 20, and 21 may be stored in a portable storage means such as a floppy disk, an optical disk, or the like such that the programs are read into a main storage device of a processing system, upon execution, for performing the processing.

While the foregoing embodiment has been described in connection with a readily appreciable relationship between a client and a server, it goes without saying that the present invention is also applicable to other apparatus having the relationship of providing and enjoying similar services.

What is claimed is:

1. An electronic commerce support method for managing trading in a client connected to a server for providing electronic commerce services to receive the electronic commerce services, comprising the steps of:

transmitting an order for a product on the electronic commerce in response to an input by a user to said server through a communication network;

receiving trading information including an e-mail address, a trading identifier associated with said order and data on the contents of said order from said communication network, and storing, when said e-mail address coincides with an address of said server to which said order was transmitted, said trading information in a storage device;

receiving from said communication network trading processing information including an e-mail address, a present status of processing for processing initiated for said order, a present status of processing for delivery of said product corresponding to said order, a present status of processing for payment processing for said trading, and the trading identifier; and comparing said trading identifier and said e-mail address included in said trading information with said trading identifier included in said trading processing information, and outputting a warning if they are not coincident, and adding said trading processing information to said trading information stored in said storage device if they are coincident.

2. A method according to claim 1, further comprising the step of:

comparing said data on the contents of said order included in said trading information with said present status of processing for the processing initiated for said order, said present status of processing for delivery of said product corresponding to said order and said present status of processing for the payment processing for said trading included in said trading processing information, and outputting a warning message, if erroneous conditions are included in any of said present status as a result of said comparing, including information of erroneous status.

3. A method according to claim 2, further comprising the step of:

sending to said server a transmission request for trading processing information including the trading identifier included in said trading information received from said server in order to receive said trading processing information from said server.

4. A method according to claim 3, wherein said step of sending a request includes transmitting a time at which said trading processing information is to be received, together with said transmission request for said trading processing information.

5. A method according to claim 2, wherein:

said present status of processing for the processing for said order included in said trading processing information includes a delivery completed date or a scheduled delivery date for the product associated with said order, said present status of processing for said delivery includes a delivery completed date or a scheduled delivery date for said product, and said present status of processing for said payment processing includes a payment completed date or scheduled payment date.

6. A method according to claim 2, further comprising the step of:

displaying trading for which delivery has been completed separately from trading for which delivery has not been completed, from said present status of processing for delivery included in said trading information, and displaying trading which have been settled separately from trading which have not been settled, from said present status of processing for payment processing for said trading.

7. A method according to claim 6, further comprising the step of:

calculating a total amount of money for products included in said trading which have not been settled, and displaying the calculated total amount of money.

8. A method according to claim 7, further comprising the step of:

comparing said total amount of money with a predetermined limit amount, and outputting a warning if said total amount of money for the products included in said trading which have not been settled exceeds said limit amount.

9. A method according to claim 1, further comprising the step of:

inputting information on a product to be returned in said displayed trading information to which said trading processing information has been added, and transmitting said information to said server.

10. A method according to claim 1, further comprising the step of:

displaying said trading information to select a portion of information from said trading information, creating new order information by modifying said selected information, and transmitting said new order information to said server.

11. A method according to claim 1, wherein said server includes a shopping server dedicated to sales of products in the electronic commerce, a payment managing server dedicated to payment processing for said sales of products in response to an instruction from said shopping server, and a delivery managing server dedicated to delivery processing in said sales of products in response to an instruction from said shopping server, and said trading information includes destination addresses of said shopping server, said payment managing server, and said delivery managing server, said method further comprising the steps of:

receiving said present status of processing for the processing for said order from said shopping server;

receiving said present status of processing for said payment processing for trading from said payment managing server; and receiving said present status of processing for said delivery from said delivery managing server.

12. A method according to claim 11, further comprising the step of:

sending to said shopping server a transmission request for order processing information including a trading identifier included in said trading information received from said shopping server in order to receive said present status of processing for the processing for said order from said shopping server.

13. A method according to claim 11, further comprising the step of:
sending to said payment managing server a transmission request for payment managing processing information including the trading identifier included in said trading information received from said shopping server in order to receive said present status of processing for said payment processing for trading from said payment managing server.

14. A method according to claim 11, further comprising the step of:
sending to said delivery managing server a transmission request for delivery managing processing information including the trading identifier included in said trading information received from said shopping server in order to receive said present status of processing for said delivery from said delivery managing server.

15. A method according to claim 1, further comprising a step of repeating said step of receiving trading processing information and said step of comparing until an end of said trading.

16. An electronic commerce support method for managing trading in a server for providing a plurality of clients with electronic commerce services, comprising the steps of:
receiving an order for a product in the electronic commerce in response to an input by a user from a client through a communication network, and performing order acceptance processing for said product in accordance with a predetermined electronic commerce processing;
transmitting to said client trading information including a trading identifier associated with said order and data on the contents of said order;
storing said trading information and an e-mail address of said client ordering said trading in a storage;
creating trading processing information including a present status of processing for processing initiated for said order, a present status of processing for delivery of said product corresponding to said order, a present status of processing for payment processing for said trading, and the trading identifier;
obtaining an e-mail address of a client as a destination of said trading information stored in said storage;
transmitting said trading processing information to said client; and
managing the present status of processing for the processing initiated for said order, the present status of the processing for delivery of said product corresponding to said order, and the present status of processing for the payment processing for said trading until the order processing, the delivery, and the payment processing are completed.

17. A method according to claim 16, further comprising a step of repeating said step of creating said trading processing information, said step of obtaining said e-mail address and said step of transmitting said trading processing information until an end of said trading.

18. A method according to claim 17, further comprising the step of:
searching for the present status for the processing for said order, the present status of the processing for delivery of said product corresponding to said order, and the present status of processing for the payment processing for said trading, based on a trading identifier involved in a request from a client, to create trading processing information, and transmitting said trading processing information to said client.

19. A server for providing electronic commerce services to a plurality of clients, comprising:
an order acceptance processing device for receiving an order for a product on the electronic commerce from a client in response to an input by a user through a communication network, and performing order acceptance processing for said product in accordance with a predetermined electronic commerce processing;
a trading information transmitting device for transmitting to said client trading information including a trading identifier associated with said order and data on the contents of said order;
a trading status transmitting device for creating trading processing information including a present status of processing for processing initiated for said order, a present status of processing for delivery of said product corresponding to said order, a present status of processing for payment processing for said trading, and the trading identifier, and transmitting said trading processing information to said client; and
an order processing managing device for managing the present status of processing for the processing initiated for said order, the present status of the processing for delivery of said product corresponding to said order, and the present status of processing for the payment processing for said trading until the order processing, the delivery, and the payment processing are completed.

20. A server according to claim 19, further comprising:
a processing status transmitting device for searching for the present status for the processing for said order, the present status of the processing for delivery of said product corresponding to said order, and the present status of processing for the payment processing for said trading, based on a trading identifier contained in a request from a client, to create trading processing information, and transmitting said trading processing information to said client.

21. A storage medium having an electronic commerce support program provided in a server for providing electronic commerce services to a plurality of clients, said program being readable by a CPU in said server for managing trading, said storage medium comprising:
a storage component having a code sequence for realizing the step of receiving an order for a product on the electronic commerce from a client in response to an input by a user through a communication network, and performing order acceptance processing for said product in accordance with a predetermined electronic commerce processing;
a storage component having a code sequence for realizing the step of transmitting to said client trading information including a trading identifier associated with said order and data on the contents of said order;
a storage component having a code sequence for realizing the step of creating trading processing information including a present status of processing for processing initiated for said order, a present status of processing for delivery of said product corresponding to said order, a present status of processing for payment processing for said trading, and the trading identifier, and transmitting said trading processing information to said client; and
a storage component having a code sequence for realizing the step of managing the present status of processing for the processing initiated for said order, the present status of the processing for delivery of said product corresponding to said order, and the present status of processing for the payment processing for said trading until the order processing, the delivery, and the payment processing are completed.

22. A storage medium having an electronic commerce support program provided in a shopping server for providing electronic commerce services to a plurality of clients, said program being readable by a CPU in said shopping server for managing trading, said storage medium comprising:
a storage component having a code sequence for realizing the step of receiving an order for a product on the electronic commerce from a client in response to an input by a user through a communication network, and performing order acceptance processing for said product in accordance with a predetermined electronic commerce processing;
a storage component having a code sequence for realizing the step of transmitting to said client trading information including a trading identifier associated with said order and data on the contents of said order;
a storage component having a code sequence for realizing the step of transmitting to said client a present status of processing for processing initiated for said order;
a storage component having a code sequence for realizing the step of transmitting a request for delivery of said product corresponding to said order to a delivery managing server connected to said shopping server; and
a storage component having a code sequence for realizing the step of transmitting a request for payment processing for said trading to a payment managing server.

23. A client connected to a server for providing electronic commerce services to receive the electronic commerce services, comprising:
an order transmitting device for transmitting an order for a product on the electronic commerce in response to an input by a user to said server through a communication network, receiving from said server trading information including a trading identifier associated with said order and data on the contents of said order from said server, and storing said trading information in a storage device;
a trading information acquiring device for receiving through said communication network from said server trading processing information including a present status of processing for processing initiated for said order, a present status of processing for delivery of said product corresponding to said order, a present status of processing for payment processing for said trading, and the trading identifier; and
an updating device for comparing said trading identifier included said trading information with said trading identifier included in said trading processing information, and outputting a warning if they are not coincident, and adding said trading processing information to said trading information stored in said storage device if they are coincident.

24. A client according to claim 23, further comprising:
a coincident check device for comparing said data on the contents of said order with said present status of processing for the processing initiated for said order, said present status of processing for delivery of said product corresponding to said order, and said present status of processing for the payment processing for said trading included in said trading processing information, and outputting a warning if erroneous conditions are included.

25. A client according to claim 24, further comprising:
a transmitting device for sending to said server a transmission request for trading processing information including the trading identifier included in said trading information received from said server in order to receive said trading processing information from said server.

26. A client according to claim 25, wherein said transmitting device transmits a time at which said trading processing information is to be received, together with said transmission request for said trading processing information.

27. A client according to claim 23, wherein said server includes a shopping server dedicated to sales of products in the electronic commerce, a payment managing server dedicated to payment processing for said sales of products in response to an instruction from said shopping server, and a delivery managing server dedicated to delivery processing in said sales of products in response to an instruction from said shopping server, and said trading information includes destination addresses of said shopping server, said payment managing server, and said delivery managing server.

28. A client according to claim 23, further comprising:
a reordering device for displaying said trading information, selecting a portion of information from said trading information, creating new order information by modifying said selected information, and transmitting said new order information to said server.

29. A storage medium having an electronic commerce support program provided in a client connected to a server for providing electronic commerce services to receive the electronic commerce services, said program being readable by a CPU in said client for managing the electronic commerce, said storage medium comprising:
a storage component having a code sequence for realizing the step of transmitting an order for a product on the electronic commerce in response to an input by a user to said server through a communication network, receiving from said server trading information including a trading identifier associated with said order and data on the contents of said order from said server, and storing said trading information in a storage device;
a storage component having a code sequence for realizing the step of receiving through said communication network from said server trading processing information including a present status of processing for processing initiated for said order, a present status of processing for delivery of said product corresponding to said order, a present status of processing for payment processing for said trading, and the trading identifier; and
a storage component having a code sequence for realizing the step of comparing said trading identifier included said trading information with said trading identifier included in said trading processing information, and outputting a warning if they are not coincident, and adding said trading processing information to said trading information stored in said storage device if they are coincident.

30. A storage medium according to claim 29, further comprising:
a storage component having a code sequence for realizing the step of comparing said data on the contents of said order with said present status of processing for the processing initiated for said order, said present status of processing for delivery of said product corresponding to said order, and said present status of processing for the payment processing for said trading included I said trading processing information, and outputting a warning message, if erroneous conditions are included in any of said present status as a result of said comparing, including information of erroneous status.

* * * * *

UNITED STATES PATENT AND TRADEMARK OFFICE
CERTIFICATE OF CORRECTION

PATENT NO. : 6,996,535 B1
DATED : February 7, 2006
INVENTOR(S) : T. Ono et al.

It is certified that error appears in the above-identified patent and that said Letters Patent is hereby corrected as shown below:

<u>Title page,</u>
Item [*] Notice, delete "This patent is subject to a terminal disclaimer".

Signed and Sealed this

Twenty-third Day of May, 2006

JON W. DUDAS
*Director of the United States Patent and Trademark Office*